United States Patent
Nan et al.

(10) Patent No.: US 11,807,577 B2
(45) Date of Patent: Nov. 7, 2023

(54) SUPER-WEAR-RESISTANT DIAMOND GLAZE, CERAMIC TILE AND PREPARATION METHOD THEREOF

(71) Applicant: Guangdong Deer New Materials Co., Ltd., Guangdong (CN)

(72) Inventors: Shunzhi Nan, Guangdong (CN); Xuecheng Kuang, Guangdong (CN); Dingming Chen, Guangdong (CN); Pengfei Xu, Guangdong (CN); Runzan Wang, Guangdong (CN); Kangming Wu, Guangdong (CN)

(73) Assignee: Guangdong Deer New Materials Co., Ltd., Foshan (CN)

( * ) Notice: Subject to any disclaimer, the term of this patent is extended or adjusted under 35 U.S.C. 154(b) by 0 days.

(21) Appl. No.: 18/078,089

(22) Filed: Dec. 8, 2022

(65) Prior Publication Data

US 2023/0257297 A1 Aug. 17, 2023

(30) Foreign Application Priority Data

Feb. 16, 2022 (CN) .......................... 202210139997.3

(51) Int. Cl.
 *C03C 8/14* (2006.01)
 *C04B 33/24* (2006.01)
 *C03C 8/08* (2006.01)
(52) U.S. Cl.
 CPC . *C03C 8/08* (2013.01); *C03C 8/14* (2013.01)
(58) Field of Classification Search
 CPC .................................. C03C 8/14; C04B 33/24
 See application file for complete search history.

(56) References Cited

FOREIGN PATENT DOCUMENTS

| CN | 102134156 B | 10/2012 | |
|---|---|---|---|
| CN | 108623164 A | 10/2018 | |
| CN | 106892683 B | 4/2019 | |
| CN | 111333433 A | 6/2020 | |
| CN | 111943724 A | 11/2020 | |
| CN | 113979787 A | 1/2022 | |
| EP | 303402 A * | 2/1989 | ............... C03C 8/02 |

OTHER PUBLICATIONS

Jifeng Tong et al., Q&A book of New Building Materials and Construction Technology—Building and Sanitary Ceramics, Apr. 30, 2001, p. 100, Chemical Industry Press, Center of Material Science and Engineering.
1st Office Action of counterpart Chinese Patent Application No. 202210139997.3 dated Mar. 23, 2022.
Notice of Allowance of counterpart Chinese Patent Application No. 202210139997.3 dated May 5, 2022.

* cited by examiner

Primary Examiner — Karl E Group

(57) ABSTRACT

The invention relates to the field of building ceramic materials, and specifically discloses a soft light super-wear-resistant diamond glaze, a ceramic tile and a preparation method thereof. The main raw materials of the super-wear-resistant diamond glaze in parts by weight are as follows: 30-70 parts of a frit, 20-55 parts of an aggregate, 0.1-6 parts of an additive, 30-50 parts of water; the frit contains $Al_2O_3 \leq 10\%$, $Na_2O+K_2O \leq 3\%$. Correspondingly, the present invention also discloses a super-wear-resistant diamond glazed ceramic tile and a preparation method thereof. The diamond glaze disclosed in present invention has the characteristics of excellent transparency, good wear resistance and stain resistance and almost has no air bubbles.

9 Claims, 1 Drawing Sheet

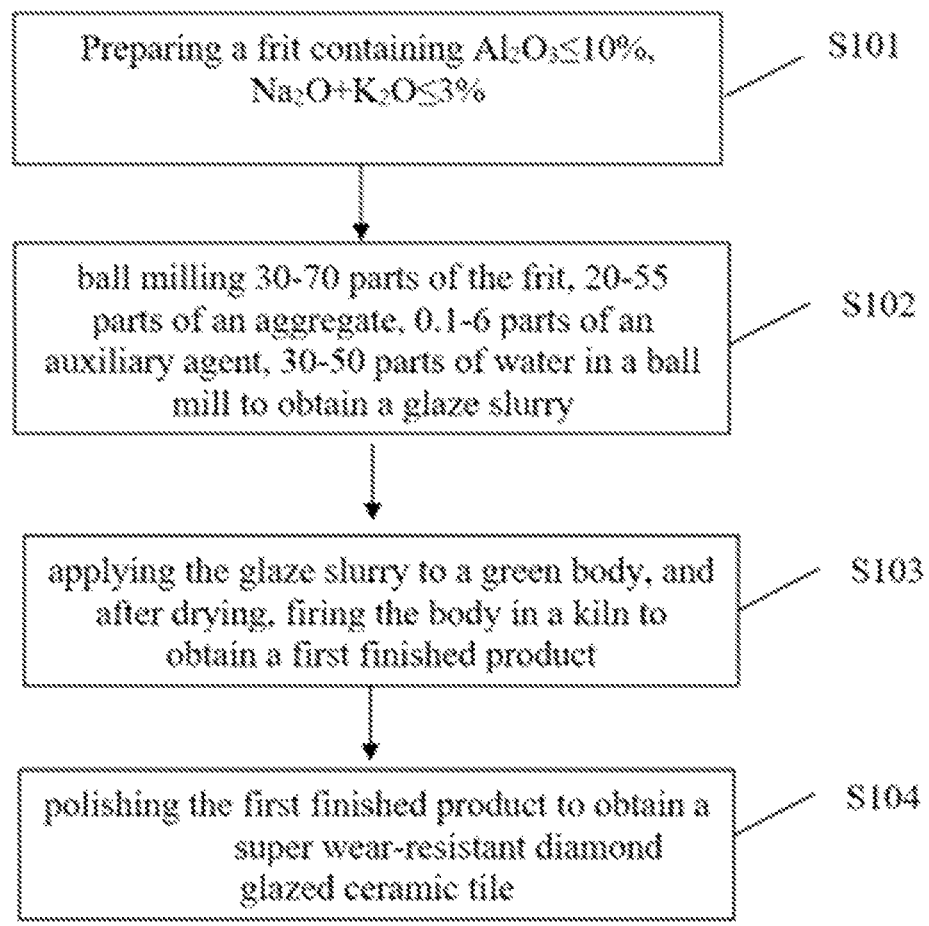

SUPER-WEAR-RESISTANT DIAMOND GLAZE, CERAMIC TILE AND PREPARATION METHOD THEREOF

CROSS-REFERENCE TO RELATED APPLICATION

The present application claims priority from Chinese Patent Application No. 202210139997.3 filed on Feb. 16, 2022, the contents of which are incorporated herein by reference in their entirety.

TECHNICAL FIELD

The invention relates to the technical field of building ceramic materials, in particular to a super wear-resistant diamond glaze, a ceramic tile and a preparation method thereof

BACKGROUND

Full-polished glaze and imitation stone have rich colors and bright luster, bringing unprecedented visual effects to the ceramic tiles. The existing full-polished glazed tile products have poor wear resistance and insufficient patterns, which are mainly reflected in the following two aspects:

The first is that a glazed surface of the ceramic tile has insufficient wear resistance and insufficient hardness, and its wear resistance is generally below 2100 revolutions. Due to insufficient wear resistance and insufficient hardness, the glazed surface of the ceramic tile is very easy to scratch, and the scratch marks are obvious. Under the refraction of light, it presents a scratchy surface, and the aesthetic effect is greatly reduced.

The second is that the glaze on the surface of the ceramic tile has not enough transparency, and usually printing of a pattern can only apply 2-3 layers of colors, which makes the traditional pattern more limited and difficult to meet the decoration requirements.

In the prior art, patent CN102134156B has disclosed a "dark-colored glass-ceramic and preparation method of dark-colored glass-ceramic composite plate", wherein a frit raw material has a formula of: $SiO_2$ 60~62%, $B_2O_3$ 1~2%, CaO 17~20%, $Al_2O_3$ 5~7%, $Na_2O$ 3~5%, ZnO 4~6% and appropriate amount of colorants. Although it adopts frit with low aluminum and high silicon content ($SiO_2$ 60~62%, $Al_2O_3$ 5~7%), because it also contains $B_2O_3$ 1~2%, $Na_2O$ 3~5%, the boron and sodium significantly reduce hardness and wear resistance of the glaze under high temperature. In addition, the patent relates to a preparation process of a glass-ceramic composite plate, and the preparation process is to classify and sieve the frit into 16-40 mesh and 8-16 mesh dry frit particles, and then coat them on an outer layer of the ceramic substrate which is then fired in a kiln.

The purpose of using a frit with low alkali metal oxide, low aluminum and low boron in the prior art 1 is to facilitate formation of M silicate crystals ($MSiO_2$) at high temperatures by the bivalent metal oxide $M^{2+}$ and silicon dioxide in the formula. Due to the presence of alkali metal oxide, boron and aluminum, it is easy to generate a glass phase with silica at high temperature, which interferes with the formation or precipitation of M silicate crystals ($MSiO_2$). However, due to the presence of boron in the glaze, it is easy to cause glaze bubbles due to the volatilization of boron at high temperatures.

In another prior art 2, patent CN106892683B discloses a method for preparing a high wear-resistant transparent fritted microcrystalline glaze for architectural ceramics, which is composed of a high aluminum-silicon frit, a high boron-silicon frit and kaolin. Among them, the ratio of the high aluminum-silicon frit and the high boron-silicon frit is 1:0.3~0.8. And the high aluminum-silicon frit and the high boron-silicon frit respectively contain 3 to 8 parts and 10 to 15 parts of boric acid. ① Generally, due to the low volatilization point of boron, during the glaze firing process, it is easy to cause pinholes on the glaze surface because of the volatilization of boron and reduce stain resistance of the glaze. ② The existence of boron significantly reduces the hardness and wear resistance of the glaze at high temperature. ③ The microcrystalline glaze is obtained base on the principle that 35~45% of cordierite crystals are precipitated in the glaze to improve the hardness and wear resistance of the glaze. But when there are a lot of cordierite crystals in the glaze, the transparency and color of the glaze will be affected.

On the other hand, there are many bright tiles on the market, and soft-light tiles are a type of tiles whose surface reflection is between a strong light and a weak light. Under strong light, the soft-light tile is good for human eyes, with comfortable vision and no light pollution. However, the soft light tile has poor stain resistance compared with the bright light tile, it is easy to absorb dirt, and the wear resistance effect does not meet the requirements.

SUMMARY OF THE INVENTION

The technical problem to be solved by the present invention is to provide a super wear-resistant diamond glaze and a super wear-resistant diamond glazed ceramic tile using the same, which has the characteristics of good soft-light effect, excellent transparency, good wear resistance, durability, stain resistance and almost has no bubbles.

The technical problem to be solved by the present invention is to provide a preparation method of a super wear-resistant diamond glazed ceramic tile, which is simple and applicable.

In order to achieve the above technical effect, the present invention provides a super wear-resistant diamond glaze, wherein main raw materials of the glaze by weight in parts are as follows: 30-70 parts of frit, 20-55 parts of an aggregate, 0.1-6 parts of an auxiliary agent, 30-50 parts of water;

In terms of weight percentage, the frit contains $Al_2O_3 \leq 10\%$, $Na_2O+K_2O \leq 3\%$, and does not contain $B_2O_3$ and $Li_2O$.

As an improvement of the above solution, the aggregate is a silicate material that does not contain alkaline fluxing agent and only contains alumina, silica, zirconia and/or titania.

As an improvement of the above scheme, the aggregate includes one or more selected from the group consisting of 5-20 parts of kaolin, 0-10 parts of a corundum powder, and 15-40 parts of a quartz powder.

As an improvement of the above scheme, the frit includes the following components by weight percentage:

$SiO_2$ 50-75%, $Al_2O_3$ 0-10%, $CaO+MgO+ZnO+BaO+SrO$=20-40%, $Na_2O+K_2O$=0-3%.

As an improvement of the above scheme, the frit includes the following components by weight percentage:

$SiO_2$ 55-65%, $Al_2O_3$ 0.1-4%, $CaO+MgO+ZnO+BaO+SrO$=30-40%, $Na_2O+K_2O$=0.01-1.3%.

As an improvement of the above scheme, the frit is obtained by the following method:

according to a frit component percentage, preparing a corresponding raw material containing the component and fully mixing;

melting a resulting mixed raw material into a glass liquid at a high temperature of 1500-1650° C., then pouring the glass liquid into water for quenching to form a frit.

As an improvement of the above scheme, the auxiliary agent includes one or more selected from the group consisting of 0.1-3 parts of a water reducing agent and 0.1-3 parts of a suspension stabilizer.

Correspondingly, the present invention also provides a super-wear-resistant diamond glazed ceramic tile, the raw materials of which include a green body and a super wear-resistant diamond glaze, and the super-wear-resistant diamond glaze is applied on the surface of the green body;

Wherein, main raw materials of the super-wear-resistant diamond glaze by weight in parts are as follows: 30-70 parts of a frit, 20-55 parts of an aggregate, 0.1-6 parts of an auxiliary agent, and 30-50 parts of water;

In terms of weight percentage, the frit contains $Al_2O_3 \leq 10\%$, $Na_2O+K_2O \leq 3\%$, and does not contain $B_2O_3$ or $Li_2O$.

As an improvement of the above solution, the aggregate is a silicate material having no alkaline fluxing agent and only containing alumina, silica, zirconia and/or titania.

The frit includes the following components by weight percentage:

$SiO_2$ 50-75%, $Al_2O_3$ 0-10%, $CaO+MgO+ZnO+BaO+SrO=20-40\%$, $Na_2O+K_2O=0-3\%$.

The auxiliary agent includes one or more selected from the group consisting of 0.1-3 parts of a water reducing agent and 0.1-3 parts of a suspension stabilizer.

As an improvement of the above scheme, the aggregate includes one or more selected from the group consisting of 5-20 parts of kaolin, 0-10 parts of a corundum powder, and 15-40 parts of a quartz powder.

Correspondingly, the present invention also provides a method for preparing a super-wear-resistant diamond glazed ceramic tile, comprising:

(1) preparing a frit, wherein the frit contains $Al_2O_3 \leq 10\%$, $Na_2O+K_2O \leq 3\%$, and does not contain $B_2O_3$ or $Li_2O$;

(2) ball milling 30-70 parts of the frit, 20-55 parts of an aggregate, 0.1-6 parts of an auxiliary agent, 30-50 parts of water in a ball mill to obtain a glaze slurry;

(3) applying the glaze slurry on a green body, and after drying, firing the body in a kiln to obtain a preliminary product;

(4) polishing the preliminary product to obtain a super wear-resistant diamond glazed ceramic tile.

As an improvement of the above scheme, step (1) includes:

according to a frit component percentage, preparing a corresponding frit raw material containing the frit component and fully mixing, wherein the frit includes the following components by weight percentage: $SiO_2$ 50-75%, $Al_2O_3$ 0-10%, $CaO+MgO+ZnO+BaO+SrO=20-40\%$, $Na_2O+K_2O=0-3\%$;

melting a resulting mixed raw material into a glass liquid at a high temperature of 1500-1650° C., pouring the glass liquid into water for quenching to obtain a frit.

As an improvement of the above scheme, the firing is carried out at a temperature of 1160-1220° C. for 35-180 minutes.

The present invention has the following beneficial effects:

The super wear-resistant diamond glaze of the invention adopts a glaze preparing system of a special frit+high-temperature raw materials (excluding flux components), wherein the frit contains $Al_2O_3 \leq 10\%$, $Na_2O+K_2O \leq 3\%$ and does not contain $B_2O_3$ or $Li_2O$. The system belongs to a low-alkali, low-aluminum, high-silicon and high-alkaline earth (containing divalent metal oxide) formulation system, which can form a glaze with soft gloss and almost no bubbles, and greatly improve the wear resistance of the glaze. At the same time, the preparing method promotes production capacity per unit energy consumption in the melting step. The glazed surface formed by the super wear-resistant diamond glaze of the present invention has a Mohs hardness of greater than 5, a wear resistance of greater than or equal to grade 4, and a visible wear is produced at a grinding revolution of 6,000-12,000. Therefore, the super wear-resistant diamond glazed ceramic tile of the present invention has the characteristics of excellent transparency, good color development effect, good wear resistance, almost no bubbles, strong stain resistance, etc. It exhibits a good soft light effect which promotes the market competitiveness.

The preparation method of the super wear-resistant diamond glazed ceramic tile of the invention has the advantages of simple process, strong practicability, and can improve product performance and reduce cost.

BRIEF DESCRIPTION OF DRAWINGS

The sole FIGURE is a flow chart of the preparation method of the super-wear-resistant diamond glazed ceramic tile of the present invention.

DETAILED DESCRIPTION OF ILLUSTRATED EXAMPLES

In order to make the objectives, technical solutions and advantages of the present invention clearer, the present invention will be further described in detail below with reference to the accompanying drawings.

The invention provides a super wear-resistant diamond glaze. The main raw materials in parts by weight are as follows: 30-70 parts of a frit, 20-55 parts of an aggregate, 0.1-6 parts of an auxiliary agent, and 30-50 parts of water. In terms of weight percentage, the frit comprises $Al_2O_3 \leq 10\%$, $Na_2O+K_2O \leq 3\%$, and does not contain $B_2O_3$ or $Li_2O$.

Preferably, the main raw materials of the super-wear-resistant diamond glaze in parts by weight are as follows: 50-70 parts of a frit, 30-50 parts of an aggregate, 0.1-3 parts of an auxiliary agent, and 30-50 parts of water. In terms of weight percentage, the frit contains $Al_2O_3 \leq 10\%$, $Na_2O+K_2O \leq 3\%$, and does not contain $B_2O_3$ or $Li_2O$.

Specifically, the invention adopts a special frit which contains $Al_2O_3 \leq 10\%$, $Na_2O+K_2O \leq 3\%$, and does not contain $B_2O_3$ or $Li_2O$. The frit has a composition with low alkali, low aluminum, high silicon and high alkaline earth (containing bivalent metal oxides).

The aggregate refers to a silicate material containing no alkaline fluxing agent and only alumina, silica, zirconia and/or titania. It should be noted that the alkaline fluxing agent refers to a substance that can reduce the softening, melting or liquefaction temperature of another substance, including an alkaline fluxing agent with calcium oxide and magnesium oxide as the main components. The aggregates are allowed to contain small amounts of impurities.

Preferably, the aggregate includes one or more selected from the group consisting of kaolin, a corundum powder, and a quartz powder, which is a high-temperature raw material and does not contain fluxing component. Further preferably, the aggregate includes one or more selected from the group consisting of 5-20 parts of kaolin, 0-10 parts of a corundum powder, and 15-40 parts of a quartz powder; the auxiliary agent includes one or more selected from the group consisting of 0.1-3 parts of a water reducing agent, 0.1-3 parts of a suspension stabilizer. More preferably, the aggregate includes one or more selected from the group consisting of 8-15 parts of kaolin, 1-8 parts of a corundum powder, and 20-30 parts of a quartz powder; the auxiliary agent includes one or more selected from the group consisting of 0.1-1 part of a water reducing agent and 0.1-1 part of a suspension stabilizer.

The diamond glaze of the present invention adopts a frit+high-temperature raw materials (without fluxing component) as a glaze system, and the composition of the glaze system does not introduce alkali and alkaline earth (including bivalent) metal oxides, boron, phosphorus and other fluxing raw materials except the frit. Therefore, the bubbles generated by the reaction between a fluxing raw material and the frit during the glaze firing process are effectively reduced.

First, a frit with low-alkali, low-aluminum, high-silicon, and high-alkaline-earth-metal (containing bivalent metal oxides) is prepared by firing. The alkaline earth metal component (containing bivalent metal oxides) in the frit has a very high fluxing property under a high temperature and is easy to react with quartz to melt it into a melted silicate liquid with low viscosity at a high temperature, which speeds up the flow out of a melted liquid from a frit kiln, reduces the melting time, and greatly improves the production capacity per unit energy consumption in the melting step.

After the frit is mixed with the raw materials of kaolin, quartz and alumina to form a glaze, during the glaze firing process, it is easy to precipitate crystals, solid solutions, or short-range ordered quasicrystals of silicates of calcium, magnesium, zinc, barium and strontium in the glaze, thereby greatly promote the wear resistance of the glaze.

The frit can be combined with the high-temperature raw materials such as kaolin, quartz and alumina to make glazes with higher gloss. That is, adding relatively larger amount of high-temperature raw materials such as kaolin, quartz and alumina into the frit can still form a glaze with better transparency and almost no bubbles.

Therefore, on the one hand, the present invention introduces a large amount of high-temperature raw materials to form high-hardness, high wear-resistance, and embedded crystals in the glaze under a high temperature, which improves the hardness and wear-resistance of the glaze; on the other hand, because the high-temperature raw materials added do not contain alkaline fluxing agent, it is not easy to generate bubbles caused by the reaction between the raw materials and the frit in the process of glaze firing. So a glaze with good transparency, good soft-light effect and almost no bubbles can be formed, and the glaze surface has almost no pinholes.

Preferably, the frit comprises the following components by weight percentage:

$SiO_2$ 50-75%, $Al_2O_3$ 0-10%, $CaO+MgO+ZnO+BaO+SrO$=20-40%, $Na_2O+K_2O$=0-3%.

Further preferably, the frit comprises the following components by weight percentage:

$SiO_2$ 55-65%, $Al_2O_3$ 0.1-4%, $CaO+MgO+ZnO+BaO+SrO$=30-40%, $Na_2O+K_2O$=0.01-1.3%.

More preferably, the frit includes the following components by weight percentage:

$SiO_2$ 58-65%, $Al_2O_3$ 0.1-3%, $CaO+MgO+ZnO+BaO+SrO$=32-40%, $Na_2O+K_2O$=0.1-1.0%.

The invention adopts a low-alkali, low-aluminum, high-silicon and high-alkaline earth metal (containing bivalent metal oxide) frit, and $SiO_2$ is added in an amount of 50-75%. $SiO_2$ is a glass network former, and its role in the glaze is to form transparent glass. $Al_2O_3$ is a glass network connector, usually the addition of alumina does provide hardness and wear resistance, but at the same time affects the transparency and color development of the glaze. $Al_2O_3$ in the present invention is added in an amount far lower than that added in conventional glazes, which is as low as 0-10%. The purpose is to improve hardness and wear resistance by forming or precipitating M silicate crystals ($MSiO_2$) in the glaze. More importantly, the present invention needs to reduce the content of sodium, boron and aluminum at the same time to reduce their interference on M silicate crystals ($MSiO_2$) at a high temperature, so as to promote the formation or precipitation of more M silicate crystals ($MSiO_2$).

It should be noted that the content of $Al_2O_3$ in the frit of the present invention can be as low as zero.

The boron in the frit can generally play the role of reducing the melting temperature of the glaze. When B2O3 is melted, many alkaline metal oxides can be melted together. However, the frit of the present invention does not need to contain boron due to the overall adjustment of the glaze system. It further avoids glaze bubbles caused by the volatilization of boron presented in the glaze at a high temperature.

$Na_2O$ and $K_2O$ play roles in destroying a glass network structure, reducing a melting temperature of the glaze, and improving the transparency of the glaze, but will reduce the hardness and wear resistance of the glaze. Compared with the prior art, the total content of $Na_2O+K_2O$ is reduced to 0-3 wt % in the present invention to achieve the effect that the glaze is mature and transparent, while has high hardness and wear resistance.

The total content of $Na_2O+K_2O$ in the glaze of the present invention can be reduced to about 0% without inducing raw firing, because the bivalent metal oxides act as a alkaline fluxing agent at high temperature, which can reduce the viscosity and surface tension of the glaze. The fluxing property of the bivalent metal oxide at a high temperature promotes a reaction between the glaze and a bottom glaze and facilitate their combination, while does not cause glaze shrinkage.

It should be noted that the content of $Na_2O+K_2O$ in the present invention can be as low as zero.

When the content of $Al_2O_3$ in the frit is 0, the frit comprises the following components by weight percentage: $SiO_2$ 60-75%, $CaO+MgO+ZnO+BaO+SrO$=25-40%, $Na_2O+K_2O$=0-3%.

When the content of $Na_2O+K_2O$ in the frit is 0, the frit comprises the following components by weight percentage: $SiO_2$ 50-75%, $Al_2O_3$ 0-10%, $CaO+MgO+ZnO+BaO+SrO$=20-40%.

When the content of $Al_2O_3$ and the content of $Na_2O+K_2O$ in the frit are both 0, the frit comprises the following components by weight percentage: $SiO_2$ 60-75%, $CaO+MgO+ZnO+BaO+SrO$=25-40%.

Regarding $CaO+MgO+ZnO+BaO+SrO$=20-40%, the functions of CaO, MgO, ZnO, BaO, and SrO are basically the same. On one hand, they provide a fluxing function. On the other hand, they combine with $SiO_2$, $Al_2O_3$ to form aluminate or silicate microcrystallines, thereby improving the hardness and wear resistance of the glaze. The difference among CaO, MgO, ZnO, BaO, SrO is that they have different fluxing abilities, different melting temperatures, and different crystallization temperatures.

Preferably, the frit is prepared by the following method:

according to a frit component percentage, preparing a corresponding raw material containing the component and fully mixing;

melting a resulting mixed raw material into a glass liquid at a high temperature of 1500-1650° C., then pouring the glass liquid into water for quenching to form a frit.

Correspondingly, the present invention also provides a super-wear-resistant diamond glazed ceramic tile, the raw materials of which include a green body and the above-mentioned super-wear-resistant diamond glaze, and the super-wear-resistant diamond glaze is applied on the green body surface.

Wherein, the super-wear-resistant diamond glaze can be applied to a variety of ceramic green bodies. Specifically, the green body raw material can be selected from: potassium sodium felspar, high white albite, high white potassium felspar sand, high white mortar, A93 ball clay, and calcined talc.

Preferably, the composition of the green body raw material is as follows:

potassium sodium felspar 20-30 wt %, high white albite 10-20 wt %, high white potassium felspar sand 20-35 wt %, high white mortar 5-15 wt %, A93 ball clay 10-30 wt %, calcined talc 0.1-5 wt %.

More preferably, an optional formula of the green body raw material is as follows:

potassium sodium felspar 22-26 wt %, high white albite 12-15 wt %, high white potassium felspar sand 25-30 wt %, high white mortar 8-12 wt %, A93 ball clay 15-25 wt %, calcined talc 1-3 wt %.

It should be noted that other green body raw materials can also be selected in the present invention, and the embodiments thereof do not limit the present invention.

Regarding the super-wear-resistant diamond glaze, its main raw materials in parts by weight are as follows: 30-70 parts of a frit, 20-55 parts of an aggregate, 0.1-6 parts of an additives, 30-50 parts of water; in term of weight percentage, the frit contains $Al_2O_3 \leq 10\%$, and $Na_2O+K_2O \leq 3\%$.

The invention adopts a special frit, which contains $Al_2O_3 \leq 10\%$, $Na_2O+K_2O \leq 3\%$, and does not contain $B_2O_3$ or $Li_2O$. The glaze adopts a formula system with low alkali, low aluminum, high silicon and high alkaline earth metal (containing bivalent metal oxides).

The aggregate refers to a silicate material containing no alkaline fluxing agent and only alumina, silica, zirconia and/or titania. It should be noted that the aggregate is allowed to contain a small amount of impurities. Preferably, the aggregate includes one or more selected from the group consisting of kaolin, a corundum powder, and a quartz powder. The aggregate is a high-temperature raw material and does not contain fluxing components. Further preferably, the aggregate includes one or more selected from the group consisting of 5-20 parts of kaolin, 0-10 parts of a corundum powder, and 15-40 parts of a quartz powder; the auxiliary agent includes one or more selected from the group consisting of 0.1-3 parts of a water reducing agent and 0.1-3 parts of a suspension stabilizers. More preferably, the aggregate includes one or more selected from the group consisting of 8-15 parts of kaolin, 1-8 parts of a corundum powder, and 20-30 parts of a quartz powder; the auxiliary agent includes one or more selected from the group consisting of 0.1-1 part of a water reducing agent and 0.1-1 part of a suspension stabilizer.

Preferably, the frit comprises the following components by weight percentage:

$SiO_2$ 50-75%, $Al_2O_3$ 0-10%, $CaO+MgO+ZnO+BaO+SrO$=20-40%, $Na_2O+K_2O$=0-3%.

More preferably, the frit includes the following components by weight percentage:

$SiO_2$ 55-65%, $Al_2O_3$ 0.1-5%, $CaO+MgO+ZnO+BaO+SrO$=20-40%, $Na_2O+K_2O$=0.01-1.5%.

It should be noted that the technical details of the super-wear-resistant diamond glaze are the same as above, and will not be repeated here.

The super-wear-resistant diamond glazed ceramic tile is obtained by applying the super wear-resistant diamond glaze on the surface of a green body, firing and polishing. After the ceramic tile of the invention is polished, the surface is flat and compact, without pits and micro-cracks, and has good stain resistance.

Correspondingly, as shown in the sole FIGURE, the present invention also provides a preparation method of a super-wear-resistant diamond glazed ceramic tile, comprising:

S101, preparing a frit, wherein the frit contains $Al_2O_3 \leq 10\%$, $Na_2O+K_2O \leq 3\%$;

S102, ball milling 30-70 parts of the frit, 20-55 parts of an aggregate, 0.1-6 parts of an auxiliary agent, and 30-50 parts of water in a ball mill to obtain a glaze slurry;

S103, applying the glaze slurry on a green body, drying, and firing in a kiln to obtain a preliminary product;

S104, polishing the preliminary product to obtain a super-wear-resistant diamond glazed ceramic tile.

Specifically, step S101 includes:

according to a frit component percentage, preparing a corresponding raw material containing the component and fully mixing, wherein the frit includes the following components by weight percentage: $SiO_2$ 50-75%, $Al_2O_3$ 0-10%, $CaO+MgO+ZnO+BaO+SrO$=20-40%, $Na_2O+K_2O$=0-3%;

melting a resulting mixed raw material into a glass liquid at a high temperature of 1500-1650° C., then pouring the glass liquid into water for quenching to obtain the frit.

Step S103 includes:

applying the super-wear-resistant diamond glaze on a dried, top-glazed and patterned green body, oven drying, and then firing in a kiln. Wherein, the surface glaze can be selected according to prior art.

The firing temperature is 1160-1220° C., and the firing cycle is 35-180 minutes.

In step S104: the polishing is mainly a soft polishing treatment, and the soft polishing treatment is carried out until the tile surface has a gloss of 22-30 degree.

To sum up, the super-wear-resistant diamond glaze of the present invention adopts a glaze system of a special frit+ high-temperature raw materials (without fluxing component), and the frit has $Al_2O_3$ of $\leq 10\%$, and $Na_2O+K_2O$ of $\leq 3\%$, and does not contain $B_2O_3$ or $Li_2O$. It belongs to a low-alkali, low-aluminum, high-silicon and high-alkaline earth (containing bivalent metal oxide) formulation system, which can form a glaze with almost no bubble, and greatly improved wear resistance. At the same time, the production capacity per unit energy consumption is promoted. The glazed surface formed by the super-wear-resistant diamond glaze of the invention has a Mohs hardness greater than 5, a wear resistance greater than or equal to level 4, and the number of revolutions at which any visible wear can be distinguished is 6000-12000 according to a test of resistance to surface abrasion for the glazed ceramic tile. Therefore, the super wear-resistant diamond glazed ceramic tile of the present invention has the characteristics of excellent transparency, good color development effect, good wear resistance, almost no bubbles, strong stain resistance and the like.

The preparation method of the super wear-resistant diamond glazed ceramic tile of the invention has the advantages of simple process, strong practicability, and can improve product performance and reduce cost.

The present invention is further described below with specific examples.

Example 1

(1) A super-wear-resistant diamond glaze includes the following raw materials in parts by weight:

70 parts of a frit, 10 parts of kaolin, 20 parts of a quartz powder, 1 part of a water reducing agent, 1 part of a suspension stabilizer, 30 parts of water;

Wherein, the frit includes the following components by weight percentage:

$SiO_2$ 50%, $Al_2O_3$ 8%, $CaO+MgO+ZnO+BaO+SrO=40\%$, $Na_2O+K_2O=2\%$.

(2) A preparation method of a super-wear-resistant diamond glazed ceramic tile includes:

(A) according to the frit component percentage, preparing a frit raw material containing the frit component and fully mixing;

melting the mixed raw material into a glass liquid at a high temperature of 1580° C., then pouring the glass liquid into water for quenching to obtain the frit;

(B) ball milling 70 parts of the frit, 10 parts of kaolin, 20 parts of a quartz powder, 1 part of a water reducing agent, 1 part of a suspension stabilizer, and 30 parts of water in a ball mill to obtain a glaze slurry;

(C) applying the glaze slurry to a dried, top-glazed and patterned green body, oven drying, and firing in a kiln to obtain a preliminary product, wherein the firing temperature is 1180° C., and the firing cycle is 90 minutes;

(D) subjecting the preliminary product to soft polishing treatment to obtain a super-wear-resistant diamond glazed ceramic tile.

Example 2

(1) A super wear-resistant diamond glaze includes the following raw materials in parts by weight:

60 parts of a frit, 10 parts of kaolin, 30 parts of a quartz powder, 0.5 part of a water reducing agent, 0.5 part of a suspension stabilizer, 35 parts of water;

Wherein, the frit includes the following components by weight percentage:

$SiO_2$ 60%, $Al_2O_3$ 5%, $CaO+MgO+ZnO+BaO+SrO=34\%$, $Na_2O+K_2O=1\%$.

(2) A preparation method of a super-wear-resistant diamond glazed ceramic tile includes:

(A) according to the frit component percentage, preparing a frit raw material containing the frit component and fully mixing;

melting the mixed raw material into a glass liquid at a high temperature of 1600° C., then pouring the glass liquid into water for quenching to obtain the frit;

(B) ball milling 60 parts of the frit, 10 parts of kaolin, 30 parts of a quartz powder, 0.5 part of a water reducing agent, 0.5 part of a suspension stabilizer, and 35 parts of water in a ball mill to obtain a glaze slurry;

(C) applying the glaze slurry to a dried, top-glazed and patterned green body, oven drying, and firing in a kiln to obtain a preliminary product, wherein the firing temperature is 1200° C., and the firing cycle is 110 minutes;

(D) subjecting the preliminary product to soft polishing treatment to obtain a super-wear-resistant diamond glazed ceramic tile.

Example 3

(1) A super-wear-resistant diamond glaze includes the following raw materials in parts by weight:

55 parts of a frit, 6 parts of kaolin, 5 parts of a corundum powder, 34 parts of a quartz powder, 2 parts of a water reducing agent, 2 parts of a suspension stabilizer, 45 parts of water;

Wherein, the frit includes the following components by weight percentage:

$SiO_2$ 65%, $Al_2O_3$ 3%, $CaO+MgO+ZnO+BaO+SrO=30\%$, $Na_2O+K_2O=2\%$.

(2) A preparation method of a super-wear-resistant diamond glazed ceramic tile includes:

(A) according to the frit component percentage, preparing a frit raw material containing the frit component and fully mixing;

melting the mixed raw materials into a glass liquid at a high temperature of 1620° C., then pouring the glass liquid into water for quenching to obtain the frit;

(B) ball milling 55 parts of the frit, 6 parts of kaolin, 5 parts of a corundum powder, 34 parts of a quartz powder, 2 part of a water reducing agent, 2 part of a suspension stabilizer, and 45 parts of water in a ball mill to obtain a glaze slurry;

(C) applying the glaze slurry to a dried, top-glazed and patterned green body, oven drying, and firing in a kiln to obtain a preliminary product, wherein the firing temperature is 1210° C., and the firing cycle is 120 minutes;

(D) subjecting the preliminary product to soft polishing treatment to obtain a super-wear-resistant diamond glazed ceramic tile.

Example 4

(1) A super-wear-resistant diamond glaze includes the following raw materials in parts by weight:

55 parts of a frit, 8 parts of kaolin, 6 parts of a corundum powder, 31 parts of a quartz powder, 1.5 parts of a water reducing agent, 1 parts of a suspension stabilizer, 38 parts of water;

Wherein, the frit includes the following components by weight percentage:

$SiO_2$ 58%, $Al_2O_3$ 10%, $CaO+MgO+ZnO+BaO+SrO=31\%$, $Na_2O+K_2O=1\%$.

(2) A preparation method of a super-wear-resistant diamond glazed ceramic tile includes:

(A) according to the frit component percentage, preparing a frit raw material containing the frit component and fully mixing;

melting the mixed raw materials into a glass liquid at a high temperature of 1580° C., then pouring the glass liquid into water for quenching to obtain the frit;

(B) ball milling 55 parts of the frit, 8 parts of kaolin, 6 parts of a corundum powder, 31 parts of a quartz powder, 1.5 part of a water reducing agent, 1 part of a suspension stabilizer, and 38 parts of water in a ball mill to obtain a glaze slurry;

(C) applying the glaze slurry to a dried, top-glazed and patterned green body, oven drying, and firing in a kiln to obtain a preliminary product, wherein the firing temperature is 1190° C., and the firing cycle is 150 minutes;

(D) subjecting the preliminary product to soft polishing treatment to obtain a super-wear-resistant diamond glazed ceramic tile.

Example 5

(1) A super-wear-resistant diamond glaze includes the following raw materials in parts by weight:

50 parts of a frit, 10 parts of kaolin, 10 parts of a corundum powder, 30 parts of a quartz powder, 1 parts of a water reducing agent, 1 parts of a suspension stabilizer, 50 parts of water;

Wherein, the frit includes the following components by weight percentage:

$SiO_2$ 70%, $Al_2O_3$ 9.5%, $CaO+MgO+ZnO+BaO+SrO$=20%, $Na_2O+K_2O$=0.5%.

(2) A preparation method of a super-wear-resistant diamond glazed ceramic tile includes:

(A) according to the frit component percentage, preparing a frit raw material containing the frit component and fully mixing;

Melting the mixed raw material into a glass liquid at a high temperature of 1650° C., then pouring the glass liquid into water for quenching to obtain the frit;

(B) ball milling 50 parts of the frit, 10 parts of kaolin, 10 parts of a corundum powder, 30 parts of a quartz powder, 1 part of a water reducing agent, 1 part of a suspension stabilizer, and 50 parts of water in a ball mill to obtain a glaze slurry;

(C) applying the glaze slurry to a dried, top-glazed and patterned green body, oven drying, and firing in a kiln to obtain a preliminary product, wherein the firing temperature is 1220° C., and the firing cycle is 60 minutes;

(D) subjecting the preliminary product to soft polishing treatment to obtain a super-wear-resistant diamond glazed ceramic tile.

Comparative Example 1

(1) A diamond glaze includes the following raw materials in parts by weight: 70 parts of a frit, 10 parts of kaolin, 20 parts of a quartz powder, 1 part of a water reducing agent, 1 part of a suspension stabilizer, and 30 parts of water;

Wherein, the frit includes the following components by weight percentage:

$SiO_2$ 50%, $Al_2O_3$ 7%, $CaO+MgO+ZnO+BaO+SrO$=40%, $Na_2O+K_2O$=2%, $B_2O_3$ 1%.

(2) The preparation method of the diamond glazed ceramic tile includes:

(A) according to the frit component percentage, preparing a frit raw material containing the frit component and fully mixing;

melting the mixed raw materials into a glass liquid at a high temperature of 1580° C., then pouring the glass liquid into water for quenching to become the frit;

(B) ball milling 70 parts of the frit, 10 parts of kaolin, 20 parts of a quartz powder, 1 part of a water reducing agent, 1 part of a suspension stabilizer, and 30 parts of water in a ball mill to obtain a glaze slurry;

(C) applying the glaze slurry to a dried, top-glazed and patterned green body, oven drying, and firing in a kiln to obtain a preliminary product, wherein the firing temperature is 1180° C., and the firing cycle is 90 minutes;

(D) subjecting the preliminary product to soft polishing treatment to obtain the diamond glazed ceramic tile.

Comparative Example 2

(1) A diamond glaze includes the following raw materials in parts by weight: 70 parts of a frit, 10 parts of kaolin, 20 parts of a quartz powder, 1 part of a water reducing agent, 1 part of a suspension stabilizer, and 30 parts of water;

Wherein, the frit includes the following components by weight percentage:

$SiO_2$ 50%, $Al_2O_3$ 7%, $CaO+MgO+ZnO+BaO+SrO$=40%, $Na_2O+K_2O$=2%, $Li_2O$ 1%.

(2) A preparation method of a diamond glazed ceramic tile includes:

(A) according to the frit component percentage, preparing a frit raw material containing the frit component and fully mixing;

melting the mixed raw materials into a glass liquid at a high temperature of 1580° C., then pouring the glass liquid into water for quenching to become the frit;

(B) ball milling 70 parts of the frit, 10 parts of kaolin, 20 parts of a quartz powder, 1 part of a water reducing agent, 1 part of a suspension stabilizer, and 30 parts of water in a ball mill to obtain a glaze slurry;

(C) applying the glaze slurry to a dried, top-glazed and patterned green body, oven drying, and firing in a kiln to obtain a preliminary product, wherein the firing temperature is 1180° C., and the firing cycle is 90 minutes;

(D) subjecting the preliminary product to soft polishing treatment to obtain the diamond glazed ceramic tile.

Comparative Example 3

(1) A diamond glaze includes the following raw materials in parts by weight: 70 parts of a frit, 10 parts of kaolin, 20 parts of a quartz powder, 1 part of a water reducing agent, 1 part of a suspension stabilizer, and 30 parts of water;

Wherein, the frit includes the following components by weight percentage:

$SiO_2$ 50%, $Al_2O_3$ 6%, $CaO+MgO+ZnO+BaO+SrO$=40%, $Na_2O+K_2O$=4%.

(2) A preparation method of the diamond glazed ceramic tile includes:

(A) according to the frit component percentage, preparing a frit raw material containing the frit component and fully mixing;

melting the mixed raw materials into a glass liquid at a high temperature of 1580° C., then pouring the glass liquid into water for quenching to become the frit;

(B) ball milling 70 parts of the frit, 10 parts of kaolin, 20 parts of a quartz powder, 1 part of a water reducing agent, 1 part of a suspension stabilizer, and 30 parts of water in a ball mill to obtain a glaze slurry;

(C) applying the glaze slurry to a dried, top-glazed and patterned green body, oven drying, and firing in a kiln to obtain a preliminary product, wherein the firing temperature is 1180° C., and the firing cycle is 90 minutes;

(D) subjecting the preliminary product to soft polishing treatment to obtain the diamond glazed ceramic tile.

Comparative Example 4

(1) A diamond glaze includes the following raw materials in parts by weight: 70 parts of a frit, 10 parts of kaolin, 20 parts of a quartz powder, 1 part of a water reducing agent, 1 part of a suspension stabilizer, and 30 parts of water;

Wherein, the frit includes the following components by weight percentage:

$SiO_2$ 50%, $Al_2O_3$ 12%, $CaO+MgO+ZnO+BaO+SrO$=36%, $Na_2O+K_2O$=2%.

(2) A preparation method of a diamond glazed ceramic tile includes:

(A) according to the frit component percentage, preparing a frit raw material containing the frit component and fully mixing;

melting the mixed raw materials into a glass liquid at a high temperature of 1580° C., then pouring the glass liquid into water for quenching to obtain the frit;

(B) ball milling 70 parts of the frit, 10 parts of kaolin, 20 parts of a quartz powder, 1 part of a water reducing agent, 1 part of a suspension stabilizer, and 30 parts of water in a ball mill to obtain a glaze slurry;

(C) applying the glaze slurry to a dried, top-glazed and patterned green body, oven drying, and firing in a kiln to obtain a preliminary product, wherein the firing temperature is 1180° C., and the firing cycle is 90 minutes;

(D) subjecting the preliminary product to soft polishing treatment to obtain the diamond glazed ceramic tile.

The ceramic tiles obtained in Examples 1-5 and Comparative Examples 1~4 were subjected to testing of hardness, abrasion resistance and stain resistance, and the results are shown in Table 1:

TABLE 1

Test results of hardness, wear resistance and stain resistance

| Item | Mohs hardness | Wear resistance | Stain resistance |
|---|---|---|---|
| Example 1 | 5 | Class 4, 8000 revolutions | Blue marker pen, 10 times, No visible stain |
| Example 2 | 5.5 | Class 4, 9000 revolutions | Blue marker pen, 10 times, No visible stain |
| Example 3 | 5.5 | Class 4, 10000 revolutions | Blue marker pen, 10 times, No visible stain |
| Example 4 | 6 | Class 4, 10000 revolutions | Blue marker pen, 9 times, No visible stain |
| Example 5 | 6.5 | Class 4, 12000 revolutions | Blue marker pen, 9 times, No visible stain |
| Comparative example 1 | 5 | Class 4, 6000 revolutions | Blue marker pen, 2 times, No visible stain |
| Comparative example 2 | 5 | Class 4, 6000 revolutions | Blue marker pen, 1 time, No visible stain |
| Comparative example 3 | 4.5 | Class 4, 2100 revolutions | Blue marker pen, 3 times, No visible stain |
| Comparative example 4 | 5.5 | Class 4, 2100 revolutions | Blue marker pen, 1 time, No visible stain |

It can be seen from the above that the wear resistance of Examples 1-5 of the present invention is good, which reaches grade 4, 8000-12000 revolutions; the hardness is high, wherein the Mohs hardness is as high as 5-6.5. And the stain resistance performance is good, which is tested using a blue oil-based marker pen, and basically no visible stain existed after painting with the pen for 10 times. Comparative Examples 1-4 could not meet the requirements of Mohs hardness, wear resistance and stain resistance at the same time. Also, the wear resistance and stain resistance of Comparative Examples 1-4 were significantly inferior to those of the present invention.

It should be noted that the test of wear resistance is based on GB/T3810.7.

The glaze layers of the ceramic tiles obtained in Examples 1-5 and Comparative Examples 1-4 were subjected to tests of transparency, color development effect and the presence of air bubbles. Among them, the transparency is measured by a visible light transmittance tester; the color development is evaluated by the Lab color model, and measured by a colorimeter; the amount of air bubbles in the glaze is observed under a 40-fold magnifying glass, and the results are shown in Table 2:

TABLE 2

Test results of transparency, color development and amount of air bubbles

| Item | Transparency (0.2 mm visible light transmission rate) | Color development | | | Bubble in the glaze |
|---|---|---|---|---|---|
| | | L | a | b | |
| Example 1 | 80% | 47.54 | 4.92 | 2.52 | No |
| Example 2 | 78% | 46.18 | 4.90 | 2.45 | No |
| Example 3 | 75% | 45.72 | 4.91 | 2.43 | No |
| Example 4 | 74% | 43.55 | 4.88 | 2.42 | No |
| Example 5 | 70% | 45.72 | 4.84 | 2.39 | No |
| Comparative example 1 | 85% | 55.37 | 4.13 | 2.16 | Yes |
| Comparative example 2 | 83% | 56.78 | 4.28 | 3.56 | Yes |
| Comparative example 3 | 85% | 59.32 | 4.89 | 3.23 | Yes |
| Comparative example 4 | 60% | 31.55 | −0.99 | −0.78 | Yes |

It should be noted that the color development index of a fully polished glaze is an empirical indicator, which is used to evaluate the color of the inkjet printing pattern decorated on the surface (bottom) glaze of the full polished glaze. The final color and vividness presented outward is under dual influence: coverage of the transparent polished glaze on the surface and a reaction between the polished glaze and a bottom layer. Due to the transparency of the surface glaze and the degree of a reaction between the glaze layer and the inkjet ink, the color and vividness presented outward are also different. According to feedback of the market demand, under normal circumstances, the ceramic tiles are easier to be accepted, recognized or favored by the market if they present a red tone, while all the colors in the inkjet ink can be presented and the tiles have good color development. In addition, the better the transparency of the transparent polished glaze, the brighter the color development. The color development effect of the present invention is measured by a colorimeter, and is determined by the L, a, and b values.

Among them, L, a, b are the chromaticity values representing the color of an object, that is, the color space coordinates of a color, and any color has unique coordinate values; where L represents lightness (black and white), a represents red and green, b represents yellow and blue. Among them, if L is a positive value, it means that the sample is brighter than the standard plate; if it is a negative value, it means that it is darker; regarding to a, if an instrument displays it is a positive value, it means that the sample is redder than the standard plate, if it is a negative value, it indicates more greenish; If b is positive, it means that the sample plate is more yellowish than the standard plate, if it is negative, it means more blueish.

It can be seen from the above that each L of Examples 1-5 of the present invention is positive, indicating that the transparency and gloss of the glaze layers are good, and the whole tile is soft and translucent. And a is a positive value, indicating that the glaze is overall reddish, which is beneficial to reveal all the colors of the inkjet ink, and the color development is good.

In Comparative Examples 1-3, although the values of a and b are both positive, they are all smaller than those of Examples 1-5, indicating that the color development is poorer, which is partly caused by introduction of boron, lithium and excessive potassium and sodium. At the same time, the introduction of boron and lithium and the introduction of too much potassium and sodium make too many bubbles form in the glaze appear, resulting in poor stain resistance of the glaze. In Comparative Example 4, due to high aluminum and low potassium and sodium content, the glaze was raw fired to a certain degree, so the brightness decreases, and the glaze turns blue and green, that is, the color development is worse.

The above are the preferred embodiments of the present invention. It should be pointed out that for those skilled in the art, without departing from the principles of the present invention, several improvements and modifications can be made, and these improvements and modifications may also be regarded as It is the protection scope of the present invention.

The invention claimed is:

1. A super-wear-resistant diamond glaze, wherein raw materials of the glaze by weight in parts are as follows: 30-70 parts of a frit, 20-55 parts of an aggregate, 0.1-6 parts of an auxiliary agent, 30-50 parts of water;
    wherein the frit comprises the following components by weight percentage:
    $SiO_2$ 50-75%, $Al_2O_3$ 0.1-4%, $CaO+MgO+ZnO+BaO+SrO$=20-40%, $Na_2O+K_2O$=0.01-1.3%, and does not contain $B_2O_3$ or $Li_2O$; and
    wherein the aggregate comprises one or more selected from the group consisting of 5-20 parts of kaolin, 0-10 parts of a corundum powder, and 15-40 parts of a quartz powder.

2. The super-wear-resistant diamond glaze of claim 1, wherein the frit comprises the following components by weight percentage:
    $SiO_2$ 55-65%, $Al_2O_3$ 0.1-4%, $CaO+MgO+ZnO+BaO+SrO$=30-40%, $Na_2O+K_2O$=0.01-1.3%.

3. The super-wear-resistant diamond glaze of claim 1, wherein the frit is obtained by the following method:
    according to the frit component percentage, preparing a corresponding raw material containing the component and fully mixing;
    melting a resulting mixed raw material into a glass liquid at a high temperature of 1500-1650° C., then pouring the glass liquid into water for quenching to form a frit.

4. The super-wear-resistant diamond glaze of claim 1, wherein the auxiliary agent comprises one or more selected from the group consisting of 0.1-3 parts of a water reducing agent and 0.1-3 parts of a suspension stabilizer.

5. A super-wear-resistant diamond glazed ceramic tile, comprising a green body and a super-wear-resistant diamond glaze of claim 1, and the super-wear-resistant diamond glaze is applied on the green body surface.

6. The super-wear-resistant diamond glazed ceramic tile of claim 5,
    wherein the auxiliary agent comprises one or more selected from the group consisting of 0.1-3 parts of a water reducing agent and 0.1-3 parts of a suspension stabilizer.

7. A method for preparing a super-wear-resistant diamond glazed ceramic tile of claim 5, comprising:
    (1) preparing a fit, wherein the frit comprises the following components by weight percentage:
    $SiO_2$ 50-75%, $Al_2O_3$ 0.1-4%, $CaO+MgO+ZnO+BaO+SrO$=20-40%, $Na_2O+K_2O$=0.01-1.3% and does not contain $B_2O_3$ or $Li_2O$;
    (2) ball milling 30-70 parts of the frit, 20-55 parts of an aggregate, 0.1-6 parts of an auxiliary agent, 30-50 parts of water in a ball mill to obtain a glaze slurry, wherein the aggregate comprises one or more selected from the group consisting of 5-20 parts of kaolin, 0-10 parts of a corundum powder, and 15-40 parts of a quartz powder;
    (3) applying the glaze slurry on a green body, and after drying, firing the body in a kiln to obtain a preliminary product;
    (4) polishing the preliminary product to obtain a super-wear-resistant diamond glazed ceramic tile.

8. The method for preparing the super-wear-resistant diamond glazed ceramic tile of claim 7, wherein step (1) comprises:
    according to a frit component percentage, preparing a corresponding raw material containing the frit component and fully mixing;
    melting a resulting mixed raw material into a glass liquid at a high temperature of 1500-1650° C., pouring the glass liquid into water for quenching to obtain the frit.

9. The method for preparing a super-wear-resistant diamond glazed ceramic tile of claim 7, wherein the firing is carried out at a temperature of 1160-1220° C. for 35-180 minutes.

* * * * *